United States Patent
Swartling et al.

(10) Patent No.: US 8,423,261 B2
(45) Date of Patent: Apr. 16, 2013

(54) GEARSHIFT CONTROL METHOD

(75) Inventors: Fredrik Swartling, Södertälje (SE); Mikael Hanson, Årsta (SE)

(73) Assignee: Scania CV AB (Publ) (SE)

( * ) Notice: Subject to any disclaimer, the term of this patent is extended or adjusted under 35 U.S.C. 154(b) by 804 days.

(21) Appl. No.: 12/599,736

(22) PCT Filed: May 12, 2008

(86) PCT No.: PCT/SE2008/050544
§ 371 (c)(1),
(2), (4) Date: Dec. 2, 2009

(87) PCT Pub. No.: WO2009/020417
PCT Pub. Date: Feb. 12, 2009

(65) Prior Publication Data
US 2010/0145593 A1   Jun. 10, 2010

(30) Foreign Application Priority Data
May 16, 2007   (SE) ........................................ 0701202

(51) Int. Cl.
*B60W 10/06* (2006.01)
*F01L 13/06* (2006.01)
*F02D 9/06* (2006.01)

(52) U.S. Cl.
USPC ........... 701/102; 123/320; 123/323; 60/605.1

(58) Field of Classification Search ................... 123/320, 123/323; 477/109, 110, 118, 32, 33; 60/602, 60/605.1; 188/273; 701/101, 102
See application file for complete search history.

(56) References Cited

U.S. PATENT DOCUMENTS

| | | | | |
|---|---|---|---|---|
| 5,228,368 A | * | 7/1993 | Kato et al. | 477/33 |
| 5,231,896 A | * | 8/1993 | Kota | 477/118 |
| 6,089,018 A | | 7/2000 | Bischoff et al. | |
| 6,503,171 B1 | * | 1/2003 | Bockmann et al. | 477/107 |
| 6,652,414 B1 | * | 11/2003 | Banks, III | 477/32 |
| 6,885,928 B2 | * | 4/2005 | Berglund et al. | 701/51 |
| 2002/0116111 A1 | | 8/2002 | Sayman | |
| 2007/0111853 A1 | | 5/2007 | King et al. | |

FOREIGN PATENT DOCUMENTS

| | | |
|---|---|---|
| EP | 0925990 A2 | 6/1999 |
| WO | WO 03/018974 | 3/2003 |

OTHER PUBLICATIONS

International Search Report dated Jun. 30, 2008, issued in corresponding international application No. PCT/SE2008/050544.

* cited by examiner

*Primary Examiner* — Stephen K Cronin
*Assistant Examiner* — Raza Najmuddin
(74) *Attorney, Agent, or Firm* — Ostrolenk Faber LLP

(57) ABSTRACT

In a method and a system for controlling the Variable Turbine Geometry (VTG) of a combustion engine during up-gear shift, the VTG is opened based on a prediction when exhaust gas pressure is stabilized. During up-gear shift the VTG is closed to a closed position (301) to build an exhaust gas pressure and reduce engine speed, and a parameter from which the engine acceleration can be deduced is recorded. The VTG is determined to be opened to an open positioning response to the recorded parameter and a target engine speed of the up-gear shift (303), and the VTG is opened at a time corresponding to said determination to reduce the exhaust gas pressure (305). Hereby the up-gear shift can be made in a short time and at smooth operational conditions.

15 Claims, 3 Drawing Sheets

GEARSHIFT CONTROL METHOD

TECHNICAL FIELD

The present invention relates to a method and an apparatus for controlling an engine during gear shift. In particular the present invention relates to a method and apparatus for controlling a vehicle equipped with an engine employing Variable Turbine Geometry (VTG) Technology.

BACKGROUND

As is the case for all gear shifting there is a desire to minimize the time required to carry out the gear shift. This is because during gear shift there cannot be any torque on the drive line. Gear shifting is also described in the international patent application having the international publication number WO 03/018974. Furthermore in the U.S. Pat. No. 6,089,018 a method of controlling a VTG during gear shift is described.

An engine used in trucks and other heavy motor vehicles, such as buses, is an engine provided with a Variable Turbine Geometry (VTG), also termed Variable Geometry Turbocharger (VGT). One reason for employing VTG technology is that it facilitates fulfillment of emission requirements for i.a. diesel engines.

Moreover, it is desired to maintain a stable exhaust gas pressure when shifting gears. A stable exhaust gas pressure is important for enabling a correct determination of the engine speed generated by the engine. A correctly determined engine speed is a prerequisite for enabling a smooth gear shift.

Hence, there exists a need for a method and a system that is capable of providing a quick gear shin, which at the same time provides for a stable exhaust gas pressure at times when the gear shift is performed so that the gear shift can be executed as quick and as smooth as possible.

SUMMARY

It is an object of the present invention to provide a method and a system that is capable providing a quick and smooth gear shift.

It is another object of the present invention to provide a method and a system that facilitates gear shift by providing good gear shift conditions.

These objects and others are obtained by the method, apparatus and computer program product as set out in the appended claims. Thus, in order to obtain a quick retardation of the engine speed during gear shift the VTG is closed to a maximally acceptable closed position. In order to enable a smooth gear shift the next gear cannot be engaged when there is a high exhaust gas pressure. The VTG is therefore opened some time before engaging the next gear. Hereby the exhaust gas pressure is allowed to stabilize before engaging the next gear.

In order for the gear shifting procedure to be as quick as possible the VTG should be in a closed position as long as possible before opening the VTG to allow the exhaust gas pressure to stabilize.

In accordance with one embodiment of the present invention the reduction in engine speed from when the VTG is opened to when the exhaust gas pressure is stabilized is predicted. The prediction model is based on the knowledge that the time to build an exhaust gas pressure is equal to the time for the exhaust gas pressure to return to a normal value and the fact that the exhaust gas pressure is proportional to the engine acceleration.

Thus, in accordance with one embodiment of the present invention the VTG is closed to a closed position to build an exhaust gas pressure, and a parameter from which the engine acceleration can be deduced is recorded. The VTG is determined to be opened to an open positioning response to the recorded parameter and a target engine speed of the up-gear shift, and the VTG is opened at a time corresponding to said determination to reduce the exhaust gas pressure. Hereby the up-gear shift can be made in a short time and at smooth conditions.

In one embodiment the VTG is closed to a maximally closed position without endangering damaging the VTG when closing the VTG to a closed position. Hereby, the time for reducing the engine speed is minimized without exposing the VTG to a high pressure drop endangering the function of the VTG.

In one embodiment the control system is adapted to take into account the time from when a signal to open the VTG is generated to when the VTG is opened when determining when the VTG is to be opened. Hereby an even more accurate prediction of the time for opening the VTG can be obtained.

Thus, by recording the behavior of the engine acceleration, for example by monitoring the engine speed over time during generation of an exhaust gas pressure up to some time during a synchronization phase it can be predicted that the reduction of exhaust gas pressure will have the corresponding characteristics. In other words the integral of the predicted engine acceleration during an exhaust gas pressure reduction period should be equal to the engine speed difference from when the VTG is opened until the exhaust gas pressure has stabilized. The VTG can hence be opened when the predicted engine speed reduction during the VTG opening is less than the difference between the current engine speed and the target engine speed for engaging the next gear.

BRIEF DESCRIPTION OF THE DRAWINGS

The present invention will now be described in more detail by way of non-limiting examples and with reference to the accompanying drawings, in which.

DETAILED DESCRIPTION

Figure 1:
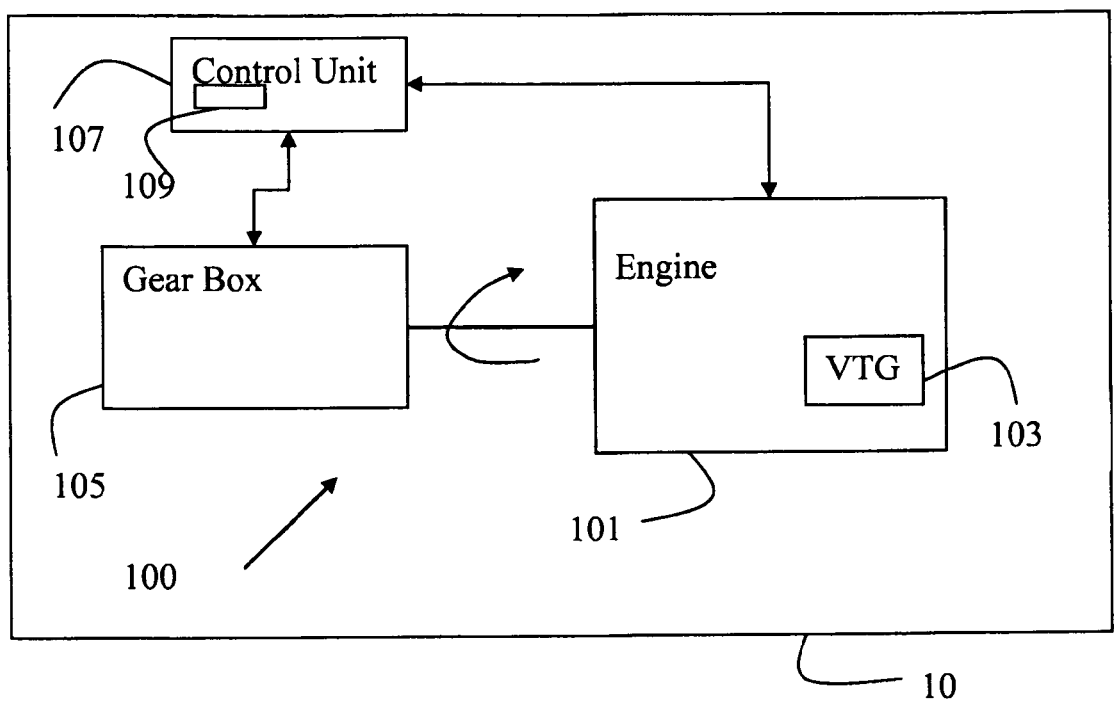
FIG. 1 is a general partial view of a drive line comprising an engine including a turbo charger with VTG.

In FIG. 1 selected parts of a drive line 100 of a motor vehicle 10 are schematically depicted. The drive line depicted in FIG. 1 can for example be designed to be part of a truck or any other heavy vehicle such as a bus or the like. The drive line 100 comprises an engine 101. The engine 101 comprises a turbocharger driven by a turbine having a Variable Turbine Geometry VTG 103. The VTG is provided with adjuster means (not shown) for opening and closing the VTG in response to different control signals. The engine is further connected to a semi-automatic gear box 105.

The engine 101 and the gearbox 105 are controlled by at least one control unit 107, for example an electronic control unit (ECU). The control unit is adapted to receive sensor signals from different parts of the vehicle, including the gearbox and the engine. The control unit 107 is also adapted to provide control signals to different parts and components of the vehicle such as the engine including but not limited to control signals to the VTG and the gear box.

The control of the different parts and components of the vehicle is governed by pre-programmed instructions stored in the control unit. The pre-programmed instructions typically are in the form of a computer program product 109 stored on a digital storage medium such as a Random Access Memory (RAM), flash, EPROM, EEPROM, or Read Only Memory (ROM) that is executed by the control unit. By changing the pre-programmed instructions the vehicle can be made to behave differently in a particular situation.

Figure 2:
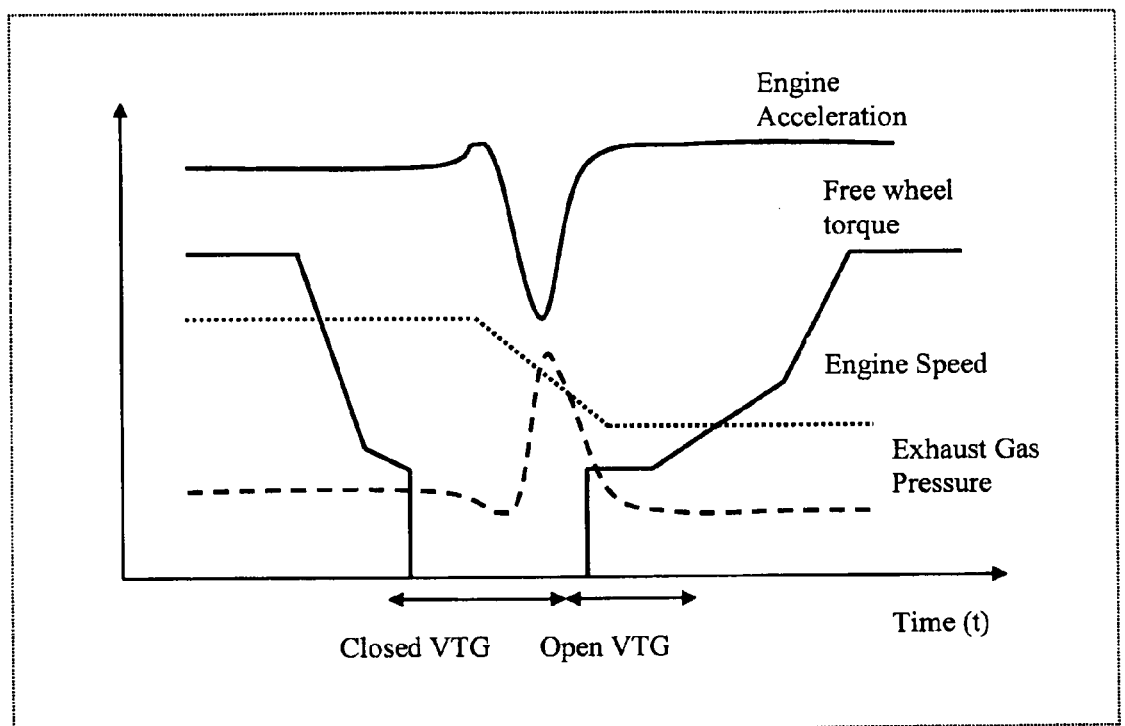
FIG. 2 is a schematic view illustrating some parameters during a gear shift of a motor vehicle.

In FIG. 2, a schematic view illustrating a typical variation of some parameters during a gear shift of a motor vehicle is shown. The parameters illustrated are parameters corresponding to engine acceleration, free wheel torque, engine speed and exhaust gas pressure.

Figure 3:
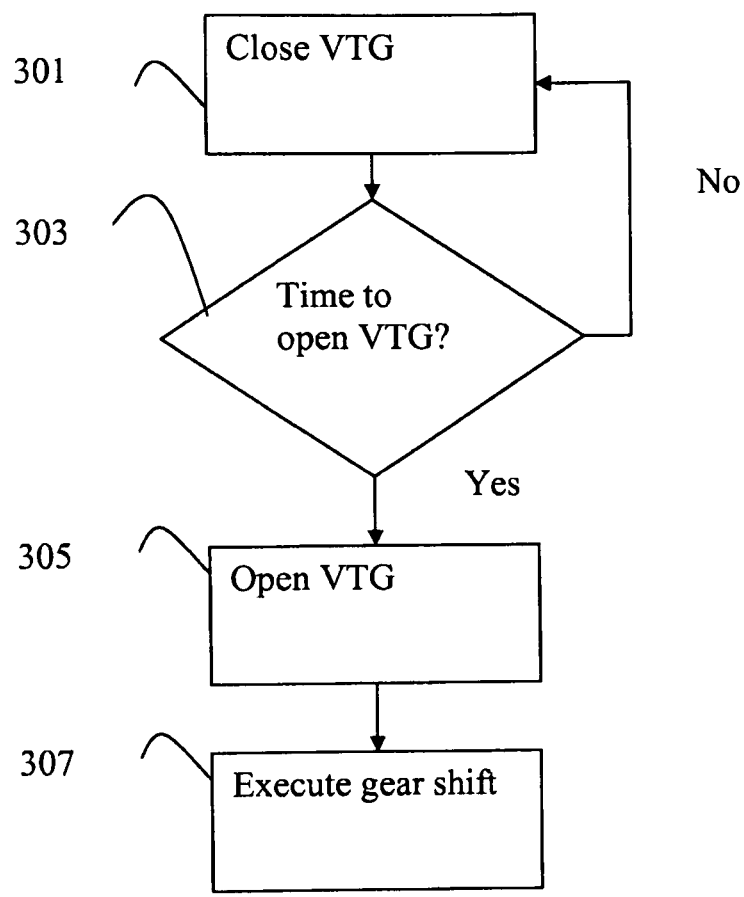
FIG. 3 is a flowchart illustrating steps performed when controlling the VTG of a motor vehicle during up-gear shift.

In FIG. 3 a flowchart illustrating some procedural steps performed when controlling a VTG of a motor vehicle during up-gear shift such as illustrated in FIG. 2 in accordance with one embodiment of the present invention is shown. First, in order to obtain a quick retardation of the engine speed during gear shift the VTG is closed to a closed position. In one embodiment the VTG is closed to a maximally acceptable closed position without risking damaging the VTG, step 301. This can for example be obtained by measuring the pressure drop over the VTG and controlling the VTG so that the pressure drop does not exceed some pre-determined threshold pressure value.

In order for the gear shifting procedure to be as quick as possible the VTG should be in a closed position as long as possible before opening the VTG to allow the exhaust gas pressure to stabilize. In accordance with one embodiment of the present invention the reduction in engine speed from when the VTG is opened to when the exhaust gas pressure is stabilized is predicted. The prediction model is based on the knowledge that the time to build an exhaust gas pressure is equal to the time for the exhaust gas pressure to return to a normal value and the fact that the exhaust gas pressure is proportional to the engine acceleration.

The VTG control procedure can also be adapted to take into account the delay time between sending a signal to open the VTG and when the VTG opens. During the time between these two events, i.e. signaling to open and actual opening, there will be a continued pressure increase. Thus, by taking the delay time into account, a more accurate prediction of the engine speed reduction from when a control signal to open the VTG is generated can be obtained.

Thus, by recording the behavior of the engine acceleration during generation of an exhaust gas pressure up to some time during a synchronization phase it can be predicted that the reduction of exhaust gas pressure will have the corresponding characteristics. In other words the integral of the predicted engine acceleration during an exhaust gas pressure reduction period should be equal to the engine speed difference from when the VTG is opened until the exhaust gas pressure has stabilized. The VTG can hence be opened when the engine speed difference is less than the current engine speed and the target engine speed for engaging the next gear.

Hence, the VTG should be opened at a time satisfying the following condition.

$$((\text{Current engine speed})-(\text{Predicted speed difference before stable pressure}))<(\text{target engine speed}) \quad [1]$$

In step 303 the procedure checks if the condition [1] is fulfilled.

Because a smooth gear shift requires a low exhaust gas pressure, the VTG is opened some time before engaging the next gear, step 305. Hereby the exhaust gas pressure is allowed to stabilize before engaging the next gear, which in turn allows for a smooth gear shift. Finally, when the engine speed has reached a speed, the target speed, that signals that a gear shift can be performed, the gear shift is performed, step 307.

By using the method and system as described herein and recording the behavior of the engine acceleration or a parameter from which the engine acceleration can be deduced, during generation of an exhaust gas pressure, the gear shift procedure can be made quick and smooth.

The invention claimed is:

1. A method of controlling a Variable Turbine Geometry of a combustion engine powering a motor vehicle during an up gear shift, the method comprising:
    closing the Variable Turbine Geometry to a maximally permitted closed position for building an exhaust gas pressure,
    recording a parameter for calculating acceleration of the engine;
    determining when the Variable Turbine Geometry should be opened based on at least the recorded parameter and a target engine speed for the up gear shift; and
    opening the Variable Turbine Geometry at a time corresponding to the determination to reduce the exhaust gas pressure.

2. The method according to claim 1, further comprising:
    measuring a pressure drop across the Variable Turbine Geometry to determine the maximally permitted closed position of the Variable Turbine Geometry;
    closing the Variable Turbine Geometry to the maximally permitted closed position; and
    controlling the Variable Turbine Geometry so that the pressure drop does not exceed a predetermined threshold value.

3. The method according to claim 1, further comprising
    calculating an amount of time from when a signal to open the Variable Turbine Geometry is generated to when the Variable Turbine Geometry opens; and
    generating the signal to open the Variable Turbine Geometry at the time when the Variable Turbine Geometry is to be opened minus the calculated amount of time.

4. The method according to 3 claim 1, wherein the step of recording the parameter for calculating the acceleration comprises recording the engine speed.

5. The method according to claim 1, wherein the step of determining when the Variable Turbine Geometry should open further comprises:
    determining a current engine speed;
    predicting a difference in engine speed prior to stable pressure in the Variable Turbine Geometry, and determining a target engine speed; and
    opening the Variable Turbine Geometry when ((Current engine speed)−(Predicted speed difference before stable pressure))<(Target engine speed).

6. A control system for controlling the position of a Variable Turbine Geometry of a combustion engine powering a motor vehicle during an up gear shift, the control system comprising:
    at least one control unit configured and operable to receive signals from at least one of a gearbox of the engine and the engine, and further configured and operable to:
    close the Variable Turbine Geometry to a maximally permitted closed position for building an exhaust gas pressure,
    record a parameter from which the engine acceleration can be calculated, determine when the Variable Turbine Geometry should be opened based on at least the recorded parameter and a target engine speed for the up gear shift, and open the Variable Turbine Geometry in relation to said determination.

7. The system according to claim 6, wherein the at least one control unit is further configured and operable to close the Variable Turbine Geometry to a maximally closed position without causing damage to the Variable Turbine Geometry from a high drop in pressure.

8. The system according to claim 6, wherein the at least one control unit is further configured and operable to calculate a time from when a signal to open the Variable Turbine Geometry is generated to when the Variable Turbine Geometry opens, and to generate the signal to open the Variable Turbine Geometry at the time when the Variable Turbine Geometry is to be opened minus the calculated amount of time.

9. The system according to claim 6, wherein the at least one control unit is further configured and operable to record the engine speed as the parameter for calculating acceleration of the engine.

10. The system according to claim 6, wherein the at least one control unit being further configured and operable to determine a current engine speed;
predict a difference in engine speed prior to stable pressure in the Variable Turbine Geometry;
determine a target engine speed; and
open the Variable Turbine Geometry when ((Current engine speed)−(Predicted speed difference before stable pressure))<(Target engine speed).

11. A non-transitory computer readable storage medium storing a computer program product for controlling the position of a Variable Turbine Geometry of an internal combustion engine powering a motor vehicle during an up gear shift, wherein the computer program product comprises program segments which, when executed on a computer for controlling the Variable Turbine Geometry, cause the computer to perform the steps of:

controlling the Variable Turbine Geometry to a maximally permitted closed position for building an exhaust gas pressure,
recording a parameter from which the engine acceleration can be calculated,
determining when the Variable Turbine Geometry should be opened based on at least said recorded parameter and a target engine speed of the up gear shift, and
controlling the Variable Turbine Geometry to open at a time corresponding to said determination to reduce the exhaust gas pressure.

12. The non-transitory computer readable storage medium storing the computer program product according to claim 11, further comprising program segments for closing the Variable Turbine Geometry to a maximally closed position without damaging the Variable Turbine Geometry from a high drop in pressure while the Variable Turbine Geometry is being closed.

13. The non-transitory computer module storage medium storing the computer program product according to claim 11, further comprising program segments for taking into account in the calculation the time from when a signal to open the Variable Turbine Geometry is generated to when the Variable Turbine Geometry is opened when determining when the Variable Turbine Geometry is to be opened.

14. The non-transitory computer module storage medium storing the computer program product according to claim 11, further comprising program segments for recording the engine speed as the parameter from which the engine acceleration can be calculated.

15. The non-transitory computer module storage medium storing the computer program product according to claim 11, further comprising program segments for deciding that the Variable Turbine Geometry should open when the condition ((Current engine speed)−(Predicted speed difference before stable pressure))<(Target engine speed) is satisfied.

* * * * *

UNITED STATES PATENT AND TRADEMARK OFFICE
CERTIFICATE OF CORRECTION

PATENT NO. : 8,423,261 B2  Page 1 of 1
APPLICATION NO. : 12/599736
DATED : April 16, 2013
INVENTOR(S) : Swartling et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 822 days.

Signed and Sealed this
Eighth Day of September, 2015

Michelle K. Lee
*Director of the United States Patent and Trademark Office*